(12) United States Patent
Schindzielorz et al.

(10) Patent No.: US 7,732,356 B2
(45) Date of Patent: Jun. 8, 2010

(54) FABRIC HAVING BALANCED ELONGATION

(75) Inventors: Michael Schindzielorz, Kernersville, NC (US); Paul Risen, Kernersville, NC (US)

(73) Assignee: Highland Industries, Inc., Greensboro, NC (US)

( * ) Notice: Subject to any disclaimer, the term of this patent is extended or adjusted under 35 U.S.C. 154(b) by 897 days.

(21) Appl. No.: 10/897,126

(22) Filed: Jul. 23, 2004

(65) Prior Publication Data

US 2006/0019561 A1    Jan. 26, 2006

(51) Int. Cl.
*D03D 15/00* (2006.01)
(52) U.S. Cl. .................................... 442/208; 280/728.1
(58) Field of Classification Search ................. 442/76, 442/181, 203, 208; 280/728.1
See application file for complete search history.

(56) References Cited

U.S. PATENT DOCUMENTS

| | | | |
|---|---|---|---|
| 1,861,422 A | 5/1932 | Cluett | |
| 2,228,001 A | 1/1941 | Cohn et al. | |
| 2,270,125 A | 1/1942 | Hurxthal | |
| 2,271,347 A | 1/1942 | Runals | |
| 2,301,249 A | 11/1942 | Butterworth, Jr. et al. | |
| 2,835,047 A | 5/1958 | Fleissner et al. | |
| 2,885,763 A | 5/1959 | Schreiner | |
| 2,932,901 A | 4/1960 | Salem et al. | |
| 3,065,551 A | 11/1962 | Cohen et al. | |
| 3,102,006 A | 8/1963 | Cohen et al. | |
| 3,267,549 A | 8/1966 | Rand | |
| 3,496,647 A | 2/1970 | Frezza | |
| 3,530,510 A | 9/1970 | Rabold | |
| 4,088,731 A | 5/1978 | Groome | |
| 4,112,559 A | 9/1978 | Troope et al. | |
| 4,345,385 A | 8/1982 | Sando et al. | |
| 4,562,627 A | 1/1986 | Milligan | |
| 4,828,909 A * | 5/1989 | Davis et al. | 442/105 |
| 5,102,724 A | 4/1992 | Okawahara et al. | |
| 5,874,372 A | 2/1999 | Morishita et al. | |
| 5,928,721 A * | 7/1999 | Parker et al. | 427/197 |
| 6,173,507 B1 | 1/2001 | Catallo | |
| 6,748,980 B2 * | 6/2004 | Matsui et al. | 139/384 R |
| 2003/0029007 A1 | 2/2003 | Keshavaraj et al. | |

* cited by examiner

*Primary Examiner*—Arti Singh-Pandey
(74) *Attorney, Agent, or Firm*—Foley & Lardner LLP

(57) ABSTRACT

A fabric having balanced stress-strain characteristics in the warp and weft directions. A method of processing the fabric includes overfeeding a woven fabric web along a first direction at one or more steps of a treatment process to facilitate crimping of the woven fabric web in the first direction. The overfeeding is indicative of a predetermined differential between a feed rate and a process rate at the one or more steps. The differential is adapted to cause the crimping in the first direction to substantially match a the level of crimping in a second direction.

3 Claims, 6 Drawing Sheets

FABRIC HAVING BALANCED ELONGATION

BACKGROUND

The present invention relates generally to the field of fabrics. In particular, the invention relates to a coated textile fabric with substantially similar elongation characteristics in the warp and weft directions.

Fabric for certain applications, such as airbags for vehicle safety restraint systems, may be required to meet certain stringent requirements. This fabric is typically a woven fabric that may be required to have, for example, a certain elasticity. The elasticity of a fabric can be measured as the elongation of the fabric. It is desirable that the crimp of the fabric be controlled during the manufacturing process so that the resulting fabric has substantially balanced elongation in each direction. Conventional fabrics generally exhibit a higher tensile strength (lower elongation) in the warp direction.

SUMMARY OF THE INVENTION

According to an embodiment of the present invention, a method of treating fabric includes overfeeding a woven fabric web along a first direction at one or more steps of a treatment process to facilitate crimping of the woven fabric web in the first direction. The overfeeding is indicative of a predetermined differential between a feed rate and a process rate at the one or more steps. The differential is adapted to cause the crimping in the first direction to substantially match a desired level relative to a level of crimping in a second direction.

In a preferred embodiment, the desired level equals the level of crimping in the second direction.

It is to be understood that both the foregoing general description and the following detailed description are exemplary and exemplary only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Figure 1:
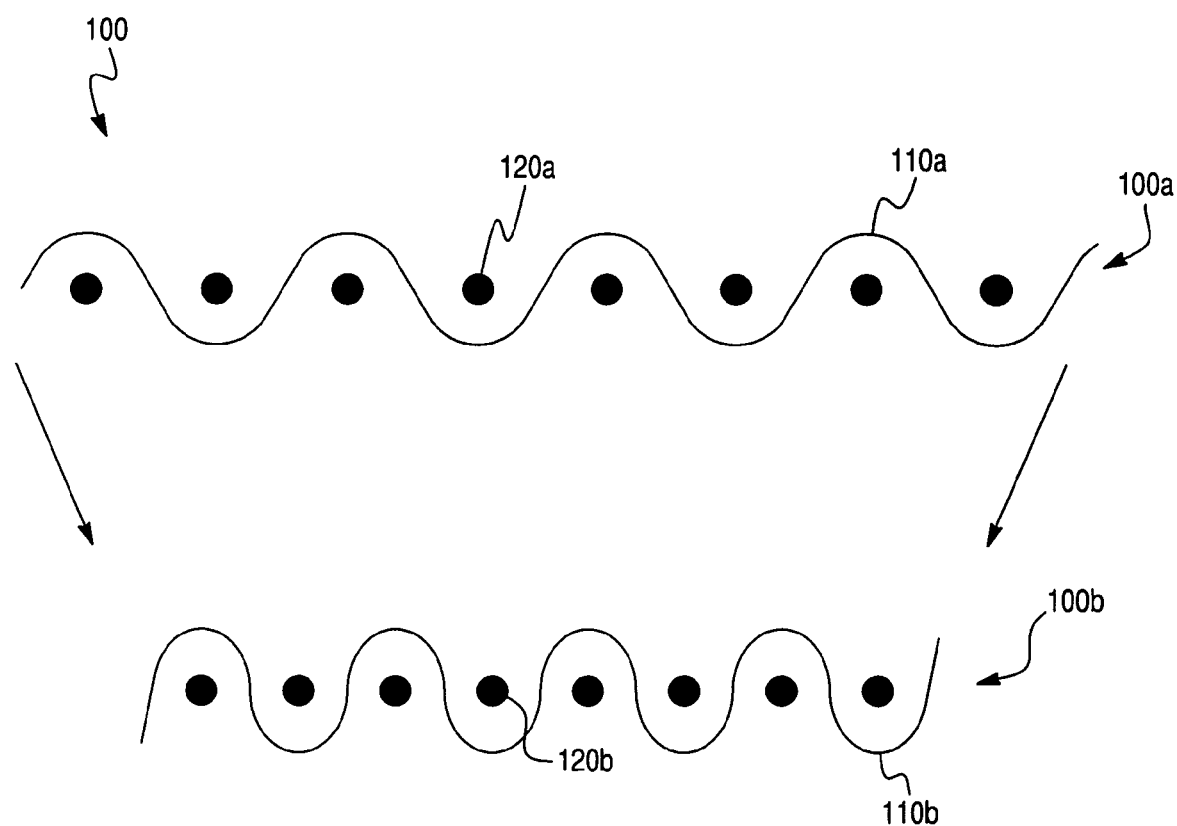
FIG. 1 illustrates the transformation of a fabric from a non-crimped state before treatment to a crimped state after treatment.

Referring to FIG. 1, a cross-sectional view of a fabric web 100 is illustrated in its pre-treatment state (fabric web 100a) and post-treatment, crimped state (fabric web 100b). The treatment process, embodiments of which are described below with reference to FIGS. 3-5, may involve coating the fabric with silicone, for example. Preferably, the fabric web is shrunk prior to the treatment process. In this regard, the effects of the treatment process, in addition to the silicone coating, are generally limited to the crimping.

The fabric web 100a is a typical woven fabric formed of longitudinal warp threads 110a and lateral weft threads 120a. The warp threads 110a and the weft threads 120a are interlaced to form the fabric web. It will be understood by those skilled in the art that the interlacing of weft and warp threads can be achieved in any number of configurations. Accordingly, the present invention is not limited to any specific configuration.

Prior to the treatment process, the warp threads 110a of the fabric web 100a in the relaxed state may interlace a certain density of weft threads 120a per unit length of the fabric web. For example, one inch of the fabric web 100a may include warp threads 110a interlacing one hundred weft threads 120a. After the treatment process, the density of weft threads 120b interlaced with the warp threads 110b in an inch of the fabric web is increased, as illustrated in the fabric web 100b in the bottom portion of FIG. 1.

Figure 2:
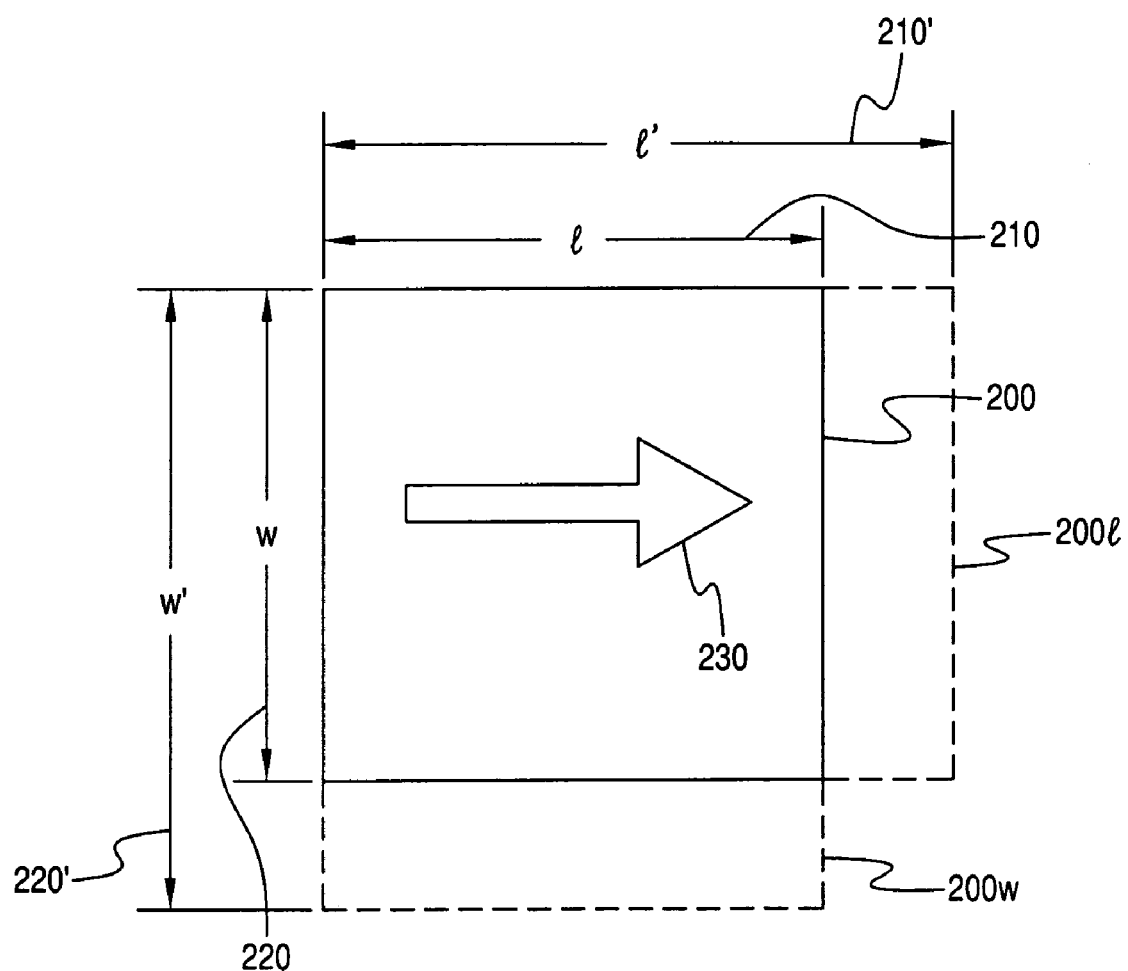
FIG. 2 illustrates a section of a fabric in its relaxed state (solid lines) and stretched states in each direction (dashed lines)

FIG. 2 illustrates a segment of a fabric that has been processed according to an embodiment of the invention. The segment 200 is shown at rest in solid lines. At rest, the segment 200 has a length l 210 and width w 220. The length l is measured in the direction in which the fabric was processed, for example, in an apparatus such as those illustrated in FIGS. 3-5. The "machine direction" or warp direction is indicated by the block arrow 230. Accordingly, the width w is measured in a "cross-machine direction" or weft direction that is perpendicular to the machine direction.

The crimp of a fabric is the amount the fabric stretches when a load is applied to one end while the other end is secured. Referring again to FIG. 2, when a load is applied in the machine direction, the length stretches to l'210'. Similarly, when a corresponding load is applied in the cross-machine direction, the width stretches to w'220'. The crimp can be expressed as the percentage of increase in the dimension. For example, the crimp in the machine direction can be expressed as:

$$C_M = \frac{(l'-l)}{l} * 100.$$

The crimp in the cross-machine direction can be similarly expressed as:

$$C_x = \frac{(w'-w)}{w} * 100.$$

Figure 3:
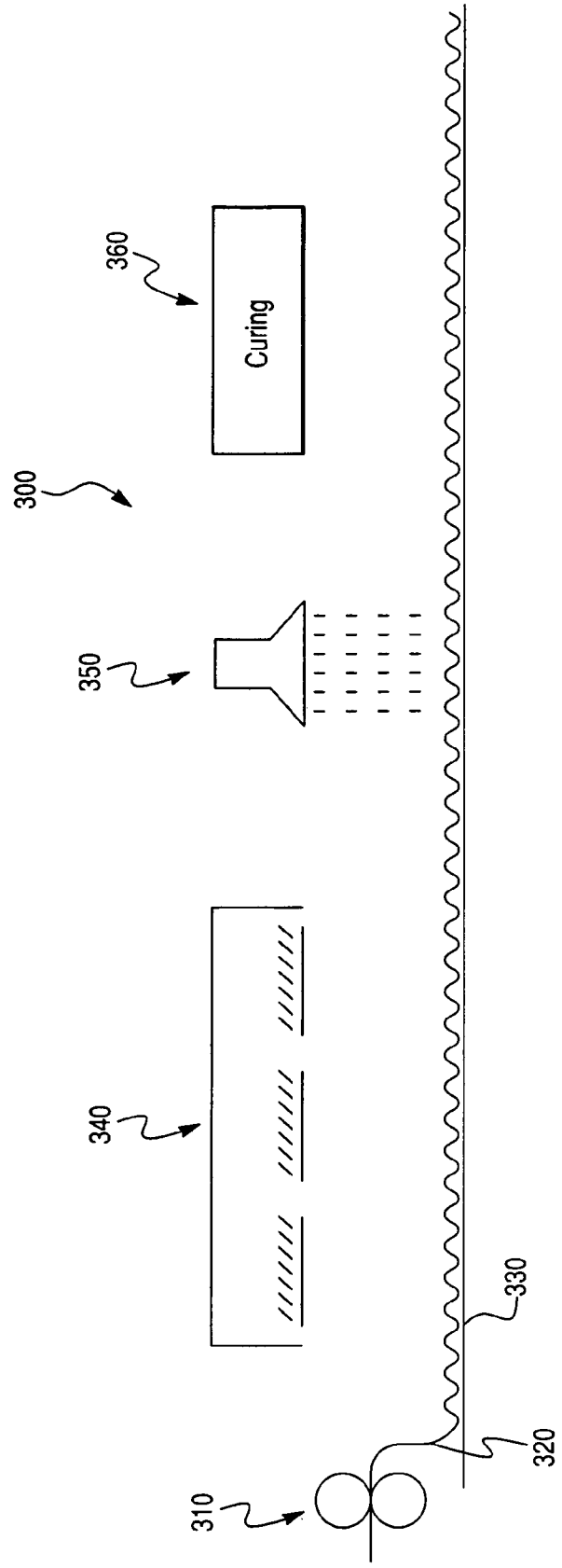
FIG. 3 illustrates an apparatus for treating a fabric according to an embodiment of the invention.
Figure 4:
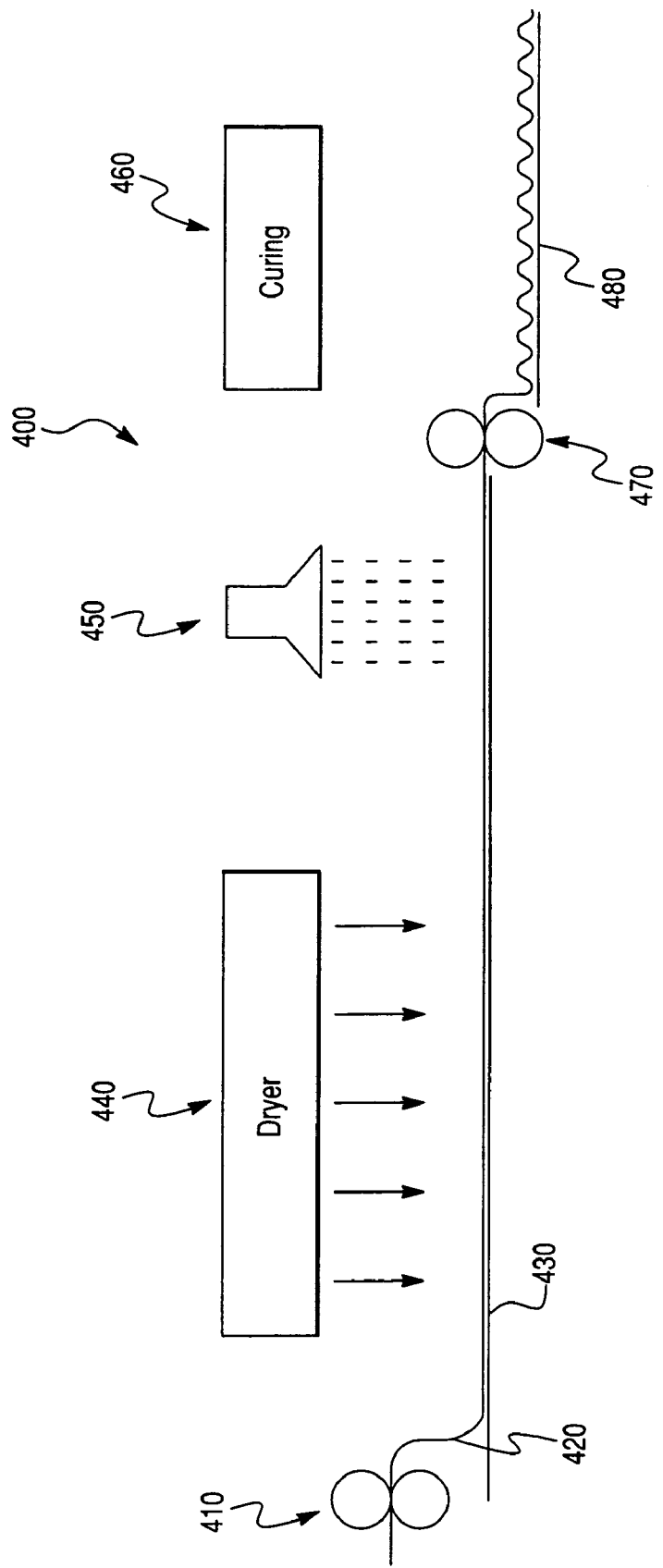
FIG. 4 illustrates an apparatus for treating fabric according to another embodiment of the invention.
Figure 5:
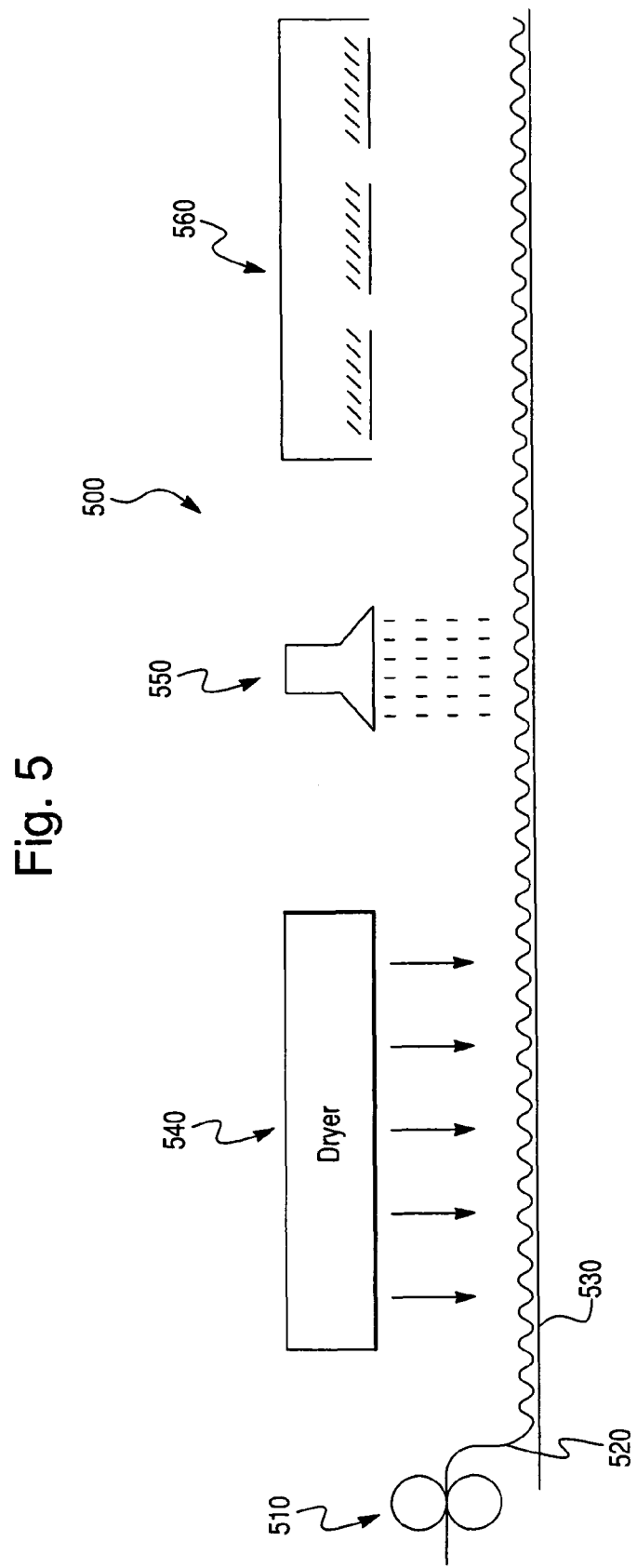
FIG. 5 illustrates an apparatus for treating fabric according to yet another embodiment of the invention.

Referring now to FIGS. 3-5, embodiments of treatment processes according to the invention will be described via description of apparatuses adapted to perform the processes. FIG. 3 illustrates an apparatus for performing a first embodiment of a treatment process according to the present invention. In this embodiment, a machine 300 is adapted to receive a fabric web 320 from, for example, a roll (not shown). The fabric web 320 is delivered into the machine through a feeding device, such as rollers 310. The rollers 310 control the rate at which the fabric web 320 is delivered into the machine 300.

The fabric web 320 is delivered by the rollers 310 onto a conveyor 330 for transporting the web through the various stages of the machine 300. The rate of transport of the conveyor 330 may be determined according to the requirements of the different stages of the treatment process. Once on the conveyor 330, the fabric web 330 is transported to a heat-setting stage 340. In this stage, the fabric web 320 may be exposed to repeated cycles of heating and cooling. Such heat-setting is well known to those skilled in the art.

Once the fabric web 320 has been heat set, the conveyor 330 transports the fabric web 320 to a coating stage 350. A silicone coating is applied to at least one surface of the fabric web at the coating stage 350. The silicone coating is then cured at a curing stage 360 of the machine 300.

The crimp level in the machine direction (left-right in FIG. 3) can be controlled by varying the rate at which the fabric web 320 is delivered to the heat-setting stage 340 of the machine 300. In this regard, the rollers 310 may overfeed the fabric web 320 to the heat-setting stage 340. In the embodiment illustrated in FIG. 3, overfeed may simply be defined as the differential between the rate at which the rollers 310 deliver the web 320 to the heat-setting stage 340 and the rate at which the web 320 is processed by the heat-setting stage 340. The rate at which the web 320 is processed is associated with the rate of transport of the conveyor 330.

Thus, by overfeeding, the rollers 310 cause compression of the fabric web 320 onto the conveyor 330, as illustrated in FIG. 3, by the sinusoidal appearance of the web 320. The web 320 in a compressed state is processed through the heat-setting stage, which substantially sets the crimp characteristics of the fabric web 320. Thereafter, the fabric web 320 is transported through the remaining stages of the treatment process in the compressed state, but the crimp characteristics may not be substantially affected.

The crimp of the fabric web 320 in the cross-machine direction, $C_X$, is unaffected by the differential between the rate of the rollers 310 and the processing rate of the heat-setting stage 340. Accordingly, differences between the crimp characteristics in the machine direction, $C_M$, and the crimp characteristics in the cross-machine direction, $C_X$, may be reduced by varying the differential to thereby control the crimp characteristics in the machine direction, $C_M$, as described above.

The above-described embodiment is suitable for use with a wet fabric web (e.g., a fabric web produced on a water jet loom). If the fabric web is already dry (e.g., a fabric web produced on a rapier or air jet loom), there is no need to pre-dry the fabric web. Thus, the heat-setting stage 340 may be eliminated so that the rollers 310 overfeed the fabric web 320 directly to the coating stage 350. The silicone coating is applied to at least one surface of the fabric web at the coating stage 350 and is cured at the curing stage 360, which substantially sets the crimp characteristics of the fabric web 320.

In a preferred embodiment, the machine-direction crimp is desired to be identical to the cross-machine-direction crimp.

FIG. 4 illustrates another apparatus for performing an embodiment of a treatment process according to the present invention. In this embodiment, a machine 400 is adapted to receive a fabric web 420 for delivery into the machine 400 through a feeding device, such as rollers 410, which places the fabric web 420 onto a conveyor 430. The fabric web 420 is transported on the conveyor 430 through a dryer stage 440 for preparing the fabric web 420 for coating with silicone, which is performed at the coating stage 450. The fabric web 420 is transported through the dryer stage 440 and the coating stage 450 substantially with no overfeed. It will be understood by those skilled in the art that, under certain circumstances, some overfeed may be required to accommodate any shrinking that may occur during the dryer stage 440 and/or the coating stage 450.

The coated fabric web 420 is then delivered by a second set of rollers 470 onto a second conveyor 480 for transporting the web through a curing stage 460 of the machine 400. An overfeed differential between the second set of rollers 470 and the second conveyor 480 causes compression of the fabric web 420 as it is processed through the curing stage 460. The compression is illustrated in FIG. 4 by the sinusoidal appearance of the web 420.

In this embodiment, the crimp level in the machine direction can be controlled by varying the differential between the rate at which the second set of rollers 470 deliver the web 420 to the curing stage 460 and the rate at which the web 420 is processed by the curing stage 460, which is associated with the rate of transport of the second conveyor 480.

Thus, the silicone coating is cured with the web 420 in a compressed state, which substantially sets the crimp characteristics of the fabric web 420. Again, the crimp of the fabric web 420 in the cross-machine direction, $C_X$, is unaffected by the differential between the rate of the second set of rollers 470 and the processing rate of the curing stage 460. Accordingly, differences between the crimp characteristics in the machine direction, $C_M$, and the crimp characteristics in the cross-machine direction, $C_X$, may be reduced by varying the differential to thereby control the crimp characteristics in the machine direction, $C_M$, as described above.

The above-described embodiment is suitable for use with a wet fabric web (e.g., a fabric web produced on a water jet loom). If the fabric web is already dry (e.g., a fabric web produced on a rapier or air jet loom), there is no need to pre-dry the fabric web. Thus, the dryer stage 440 may be eliminated so that the first conveyor 430 transports the fabric web 420 directly to the coating stage 450 substantially with no overfeed. The coated fabric web 420 is then delivered by the second set of rollers 470 onto the second conveyor 480 for transporting the web through the curing stage 460 of the machine 400. The overfeed differential between the second set of rollers 470 and the second conveyor 480 causes compression of the fabric web 420 as it is processed through the curing stage 460, which substantially sets the crimp characteristics of the fabric web 420.

A third apparatus for performing an embodiment of a treatment process according to the present invention is illustrated in FIG. 5. In this embodiment, the crimp characteristics are set during an initial drying stage 540 by processing the fabric web 520 in a compressed state through the drying stage 540. A machine 500 is adapted to receive a fabric web 520 through a feeding device, such as rollers 510. The rollers 510 control the rate at which the fabric web 520 is delivered into the machine 500.

The fabric web 520 is delivered by the rollers 510 onto a conveyor 530 for transporting the web through a drying stage 540 of the machine 500. An overfeed differential between the rollers 510 and the conveyor 530 causes compression of the fabric web 520 as it is processed through the drying stage 540. The compression is illustrated in FIG. 5 by the sinusoidal appearance of the web 520.

In this embodiment, the crimp level in the machine direction can be controlled by varying the differential between the rate at which the rollers 510 deliver the web 520 to the drying stage 540 and the rate at which the web 520 is processed by the drying stage 540, which is associated with the rate of transport of the conveyor 530.

The conveyor 530 then transports the fabric web 520 to a coating stage 550. The silicone coating is then cured through a heat-set process at a heat setting stage 560.

As in the previous embodiments, the crimp of the fabric web 520 in the cross-machine direction, $C_X$, is unaffected by the differential between the rate of the rollers 510 and the processing rate of the drying stage 540. Accordingly, differences between the crimp characteristics in the machine direction, $C_M$, and the crimp characteristics in the cross-machine direction, $C_X$, may be reduced by varying the differential to thereby control the crimp characteristics in the machine direction, $C_M$, as described above.

The above-described embodiment is suitable for use with a wet fabric web (e.g., a fabric web produced on a water jet loom). If the fabric web is already dry (e.g., a fabric web produced on a rapier or air jet loom), there is no need to pre-dry the fabric web. Thus, the dryer stage 540 may be eliminated so that the rollers 510 overfeed the fabric web 520 directly to the coating stage 550. The silicone coating is applied to at least one surface of the fabric web at the coating stage 550 and is cured at the heat-setting stage 560, which substantially sets the crimp characteristics of the fabric web 520.

According to an embodiment of the present invention, a fabric is provided wherein the fabric exhibits substantially the same elongation characteristics in both the warp and weft directions. The fabric may be formed through an suitable process such as, for example, the processes described above.

Figure 6:
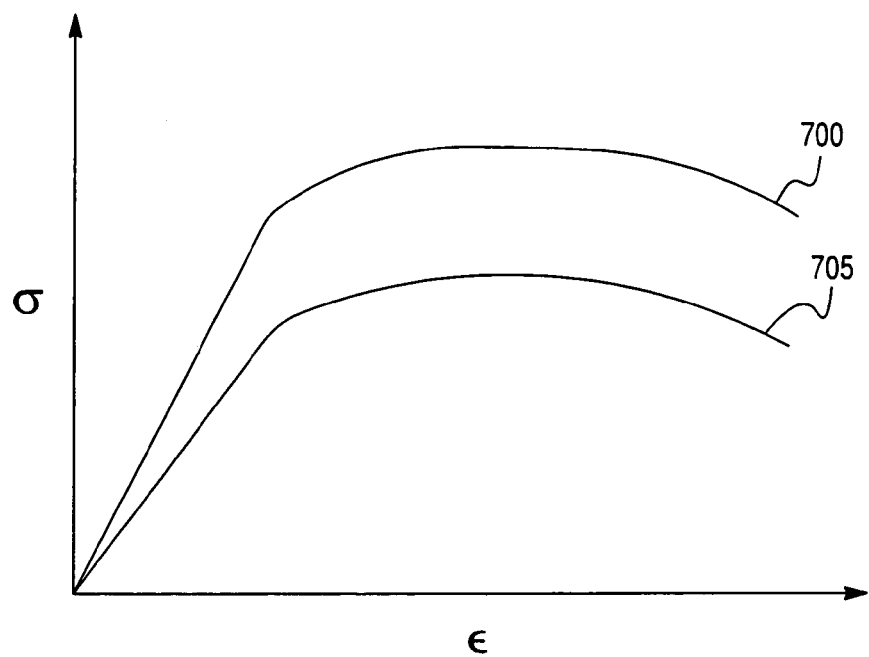
FIG. 6 is a graph of stress strain curves for a prior art fabric.

In a conventional fabric, the tensile strength of the fabric in the warp direction was substantially greater than the tensile strength of the fabric in the weft direction. For example, the tensile strength of the fabric in the warp direction was typically more than 20 percent greater than the tensile strength of the fabric in the weft direction. A stress-strain diagram for a conventional fabric is shown in FIG. 6. As shown in FIG. 6, the stress-strain curve 700 for the fabric in the warp direction is higher than the stress-strain curve 705 for the fabric in the weft direction. As described above, this difference is indicative of a tensile strength variation of 20 percent or greater between the warp and weft directions of the fabric.

Figure 7:
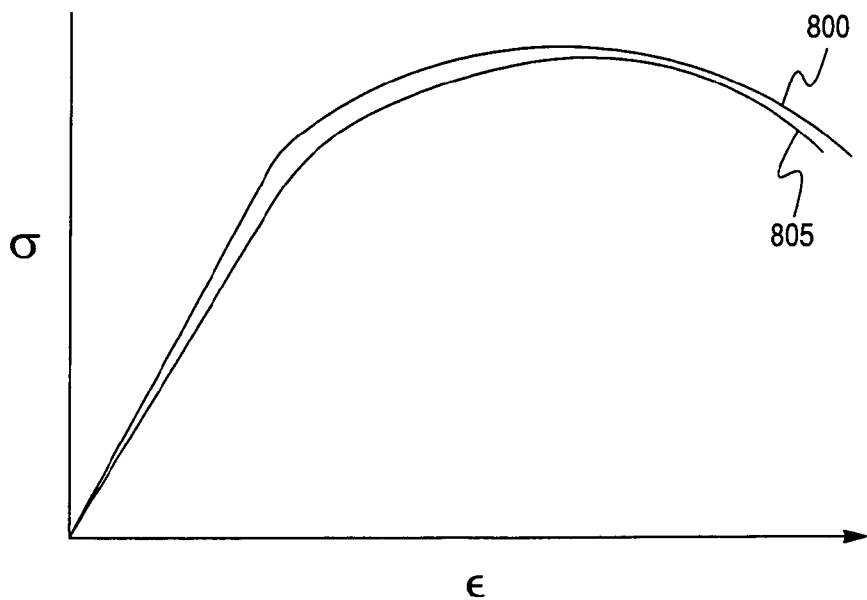
FIG. 7 is a graph of stress strain curves for a fabric according to an embodiment of the present invention.

According to an embodiment of the present invention, the fabric exhibits balanced elongation and stress-strain characteristics in the warp and weft directions. For example, according to an embodiment of the present invention, the tensile strength of the fabric in the warp direction is substantially equal to the tensile strength of the fabric in the weft direction. According to an embodiment of the present invention, the tensile strength of the fabric in the warp direction is only 10 percent or less greater than the tensile strength of the fabric in the weft direction. A stress-strain diagram for an embodiment of the present invention is shown in FIG. 7. As shown in FIG. 7, the stress-strain curve 800 for the fabric in the warp direction is higher than the stress-strain curve 805 for the fabric in the weft direction. As described above, this difference is indicative of a tensile strength variation of 10 percent or less between the warp and weft directions of the fabric.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A coated woven fabric wherein the elongation of the fabric in the warp and weft directions is balanced so that the difference between the tensile strength of the fabric in the warp and weft directions is less than or equal to about ten percent further comprising a coating comprising silicone.

2. The fabric of claim 1, wherein the difference between the tensile strength of the fabric in the warp and weft directions is less than or equal to about five percent.

3. An airbag fabric woven in a process having a machine direction, wherein the crimp of the fabric in the machine direction is within about ten percent of the crimp of the fabric in the cross machine direction, wherein the fabric has a compressed structure in the machine direction.

* * * * *